Feb. 24, 1942.   J. H. PRATT ET AL.   2,274,213
VEHICLE BRAKE
Filed June 27, 1939   3 Sheets-Sheet 3

James H. Pratt
Gilbert E. Manley
Albert H. G. Girling
Marshall & Marshall
Attorneys Patented Feb. 24, 1942

2,274,213

UNITED STATES PATENT OFFICE 2,274,213

VEHICLE BRAKE

James Henry Pratt, Gilbert Edgar Manley, and Albert Henry Godfrey Girling, Birmingham, England Application June 27, 1939, Serial No. 281,404
In Great Britain July 8, 1938

4 Claims. (Cl. 188—72)

This invention has reference to improvements relating to vehicle brakes of the disc type and has for its object the provision of an improved vehicle brake of the said type which is robust in construction, efficient in use, capable of being readily adjusted when in position and which possesses a degree of self energising braking effort in each direction of movement.

The invention consists of an improved vehicle brake of the disc type which is characterised in that there is interposed between a movable clamping means and a relatively fixed member movable means a movement whereof obtains when the movable clamping means is brought into contact with the disc during turning of the disc whereby the said movable means is caused to exert an increased clamping effort on the aforesaid movable clamping means thus introducing an additional braking effort by self energisation.

The invention also resides in an improved vehicle brake of the disc type in which adjustment to compensate for wear can be made by the manipulation of means which is capable of being actuated from the outer side of the brake when in position.

The invention further resides in the means for actuating the movable clamping members in brakes of the disc type whereby the said movable clamping members are caused to engage the respective discs in planes which are oblique to the direction of travel.

The invention still further resides in the details of construction of the improved vehicle brake of the disc type to be described hereinafter.

A convenient embodiment of the invention will now be described with particular reference to the accompanying sheets of drawings which illustrate the invention in its application to a disc brake for use with very heavy motor vehicles.

In the drawings.

Like numerals of reference indicate similar parts in the several views.

Figure 1:
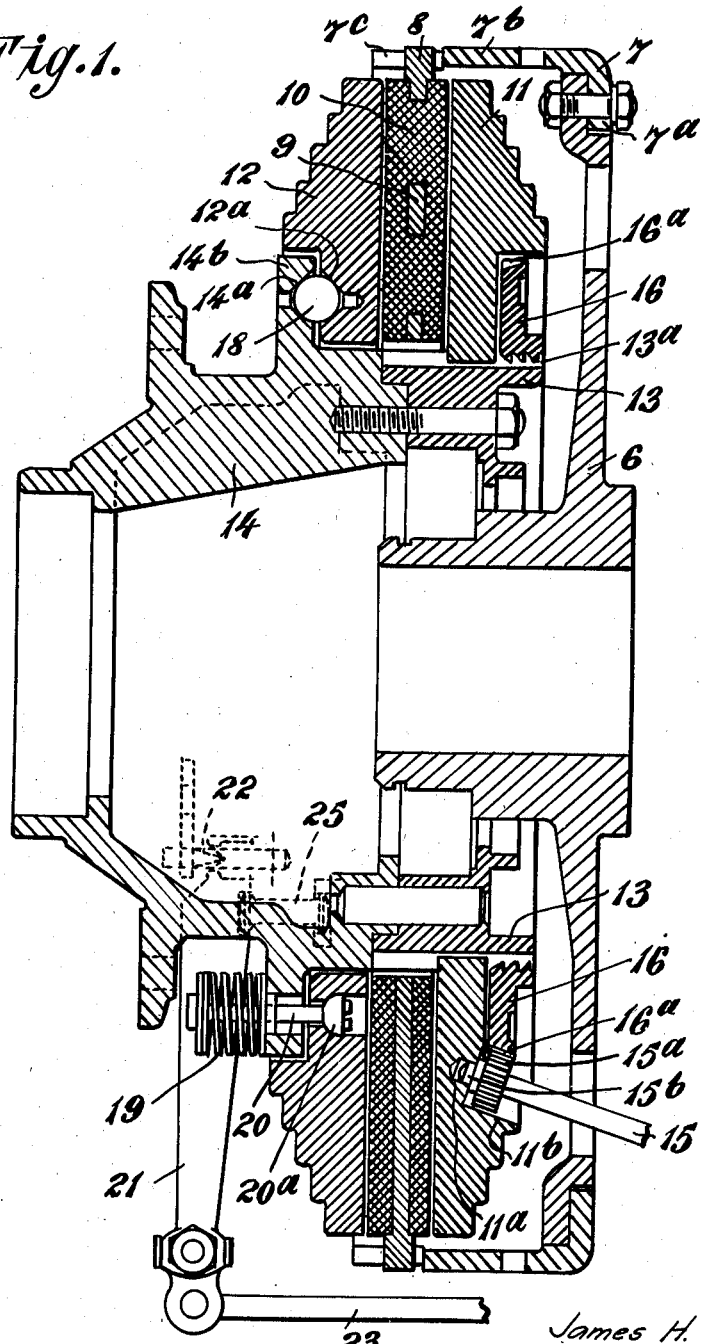
Figure 1 is a vertical section of the improved disc brake.
Figure 2:
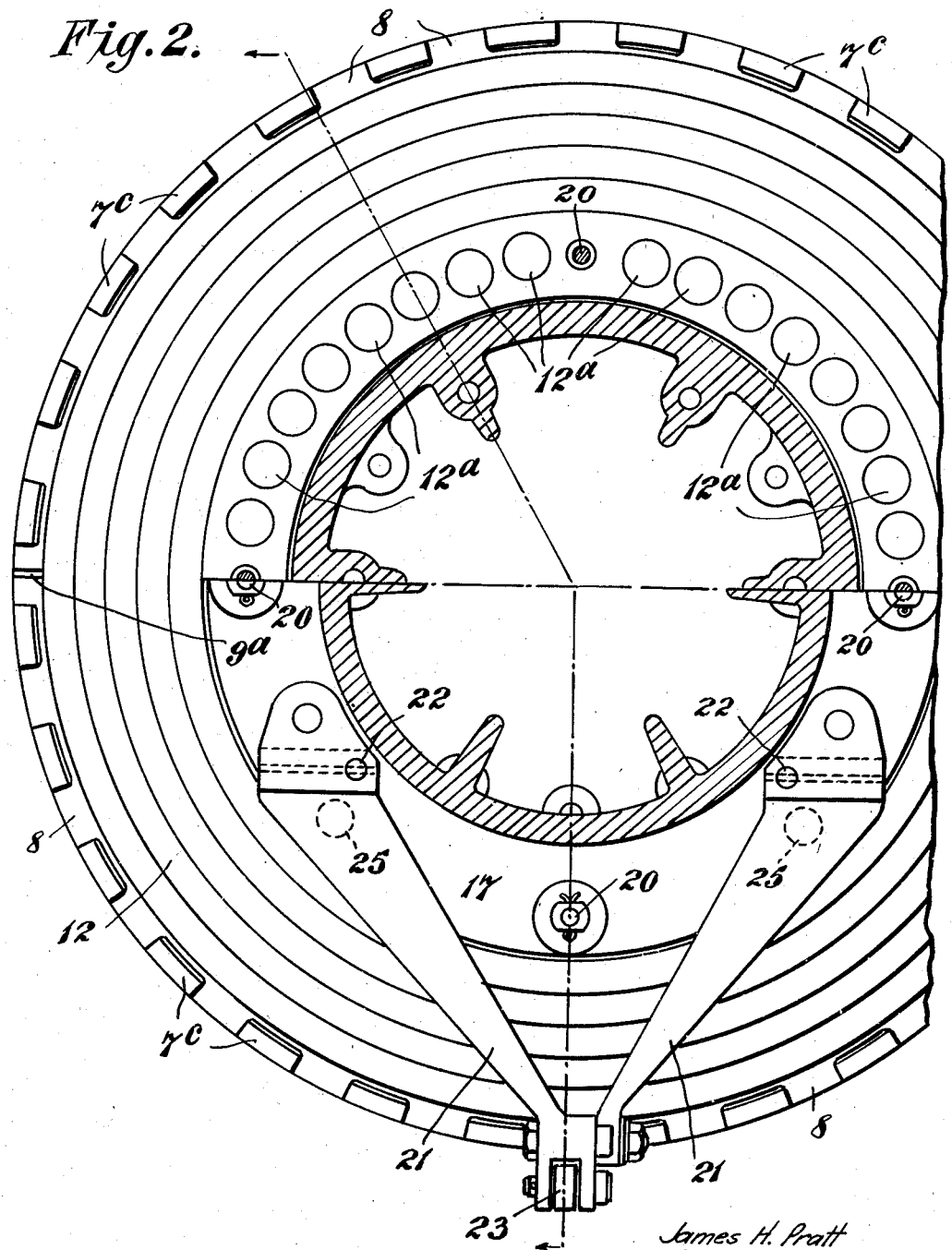
Figure 2 is a rear view of the brake illustrated in Figure 1 with some of the upper parts removed for the sake of clearness.
Figure 3:
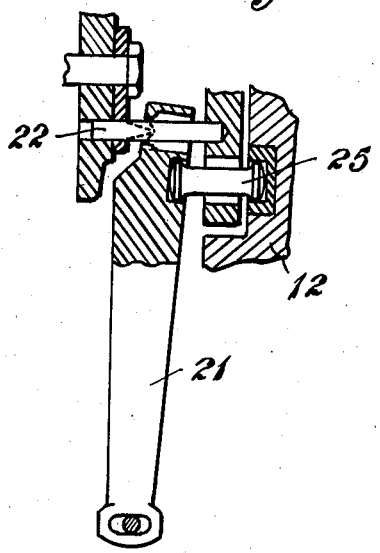
Figure 3 is a fragmentary view of a lever operated means for actuating the movable member of the brake.

According to the embodiment of the invention illustrated the wheel 6 has bolted thereto adjacent its periphery the vertical limb 7ª of an annular carrier plate, referred to generally by the reference numeral 7, of a substantially right angle shape in cross section, the horizontal limb 7ᵇ of said carrier plate 7 being arranged on the inner side of the wheel 6. Adjacent the end the horizontal limb 7ᵇ of the said carrier plate 7 is provided with a plurality of equidistantly spaced slots 7ᶜ within which are engaged correspondingly arranged projections 8 which project outwardly from the periphery of a metallic disc, 9 which constitutes the braking disc so that the disc 9 is capable of a floating movement toward and away from the carrier plate 7 but is always incapable of rotary movement relatively thereto. The brake disc 9 has fixed thereto on each side a block 10 of friction material which is preferably moulded on to the disc. The faces of the blocks 10 of friction material co-operate with clamping members 11, 12 the outermost of which, namely 11, will be referred to hereinafter as the fixed clamping jaw 11. This fixed clamping jaw 11 is in the form of a heavy cast iron ring which is splined on a central portion 13 which is bolted to a fixed part of the axle casing 14. At a convenient point the flange of the wheel 6 is provided with an opening through which may be passed a tool 15 bearing adjacent its end a pinion 15ª. The inner end of the tool 15 is constituted by a short cylindrical spigot 15ᵇ. The fixed clamping jaw 11 is provided with a cylindrical hole 11ª for the reception of the spigot 15ᵇ and with a gapped portion 11ᵇ for the accommodation of the pinion 15ª. The teeth of the pinion 15ª are adapted to mesh with teeth 16ª formed around the periphery of an annular locking ring 16 which is adjustably mounted on a screw threaded portion 13ª of the central portion 13, so that by engaging the spigot 15ᵇ in the hole 11ª, and the pinion 15ª in the gapped portion 11ᵇ, with the teeth of the said pinion 15ª in mesh with the teeth 16ª and rotating the tool 15 the locking ring 16 may be adjusted on the central portion 13 for determining the position of the fixed clamping jaw 11 relatively to said portion for adjusting the position of the fixed clamping jaw 11 relatively to the presented faces of the blocks 10 carried by the disc 9 in order to compensate for wear when necessary. The co-operating clamping member 12 which will be referred to hereinafter as the movable clamping member 12 is in the form of an annulus which is provided on its rear face and in the upper half thereof with a plurality of conically sided pits 12ᵃ which are complementary to similar conically sided pits 14ᵃ formed in the adjacent face of a peripheral flange 14ᵇ forming part of the axle casing 14. Located within each pair of pits 12ᵃ, 14ᵃ is a bearing ball 18, and the walls of the pits 12ᵃ, 14ᵃ are normally held in contact with the periphery of their respective balls 18 when the brake is out of action by adjustable springs 19 operating through struts 20 having ball ends 20ᵃ which co-operate with complementary seatings formed in the movable clamping member 12, the said springs 19 also tending to hold the movable clamping member 12 out of the clamping position when the brake is required to be out of action.

The movable clamping member 12 is adapted to be operated by a bowed lever 21 which is fulcrummed on knife-edges 22 arranged symmetrically on either side of the casing 14 in the lower half thereof, the lower end of the bowed lever 21 being pivotally connected to a rod 23 which in turn is connected to the brake applying means (not shown). The bowed lever 21 co-operates with ball ended struts 25 which transmit movements of the said bowed lever 21 to the movable clamping member 12 when the brake is to be applied manually.

Figure 4:
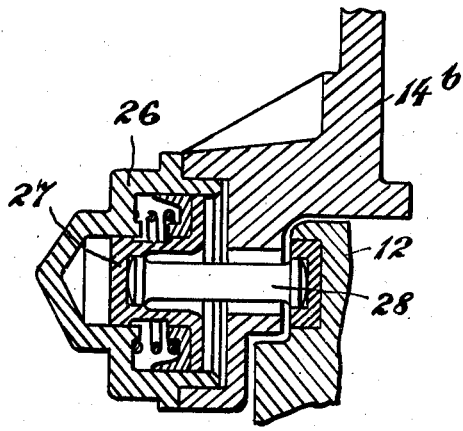
Figure 4 is a fragmentary view of a hydraulic means for actuating the movable member of the brake.

In place of, or in addition to, the bowed lever 21 the brake may be applied by moving the movable clamping member 12 by hydraulic means, which as illustrated in Figure 4 comprises a hydraulic cylinder 26 carried by the flange 14ᵇ having therein a piston 27 which actuates the movable clamping member 12 through the agency of a ball ended strut 28.

Two of these hydraulic devices would be utilised in the embodiment of the invention illustrated and they would be located adjacent the points where the bowed lever 21 applies its braking force.

It is found that during a braking operation with the disc 9 turning, when the friction face of the movable clamping member 12 contacts with the friction face of the block 10 the balls 18 run up the sides of the respective pits 12ᵃ, 14ᵃ and provide a self-energising braking effort, the degree of which is found to be determined by the angle of inclination of the sides of the pits 12ᵃ, 14ᵃ, a convenient angle being 40°. The balls 18 are located in the upper portion of the movable clamping member 12, whereas the springs 19 that return the clamping member 12 to its inoperative position when the brake is released are equally spaced around the clamping member 12. Thus the resultant of the force exerted by the wedging balls 18 is substantially displaced from the resultant of the force exerted by the releasing springs 19.

Moreover, it will be seen that the self-energising effort acts equally in each direction of rotation and that the relatively heavy mass of the clamping members 11, 12 and the parts which carry these members results in the brakes operating under cool conditions. The cool operation of the brakes is further enhanced by forming holes in the central portion of each wheel and in the carrier plate 7 which provide for the circulation of a current of air through the brake as a whole.

It should also be appreciated that upon application of the braking pressure with the disc 9 turning the said movable clamping member 12 is caused to engage the said disc 9 obliquely, which oblique movement again is found to exert a powerful self-energising effect. It is found that a useful degree of self-energising braking effort so obtainable is 100% increase of the braking force resulting directly from the operation of the brake actuating means with the disc 9 turning. The obliquity is the product of movement produced by the perpendicular movement resulting from the drivers control and the circumferential movement resulting from disc rotation.

In the case of a brake for light vehicles only a pair of balls 18 are required and these may be located in pits arranged in the upper half of the brake in positions corresponding to the positions at which the braking effort is applied in the lower half.

Figure 5:
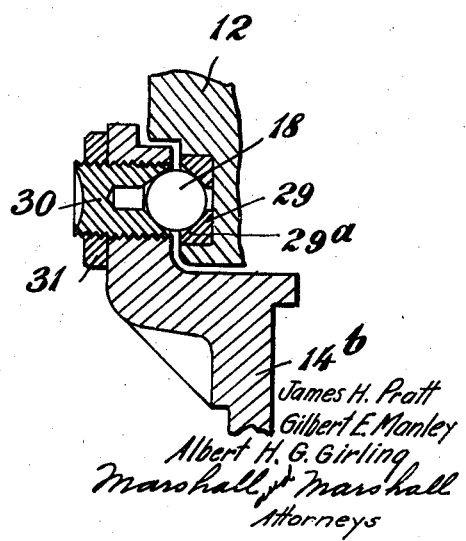
Figure 5 is a fragmentary view of a modified means of mounting the interposed movable means.

In the modification illustrated in Figure 5, instead of forming the pits 12ᵃ and 14ᵃ in the movable clamping member 12 and the flange 14ᵇ, the conical faced pit associated with the movable clamping member 12 is formed in a separate annulus 29 having in the centre thereof a conically seated recess 29ᵃ, whereas the conical faced pit associated with the flange 14ᵇ is formed as a conical recess in the inner end of a plug 30 adapted to screw into a hole in the said flange 14ᵇ, a nut 31 being provided for locking the screw plug in the opposite position.

What we claim is:

1. A brake of the disk type for a vehicle wheel comprising, in combination, a friction member rotatable with the wheel, a second friction member, a non-rotatable thrust-receiving member adjacent the second friction member, energizing means actuated by rotation of the second friction member relative to the thrust-receiving member for thrusting the second friction member toward the first friction member, the force exerted by said energizing means being applied at points substantially to one side of a plane passing through the axis of rotation, yieldable means for normally thrusting the second friction member away from the first friction member, the force exerted by said yieldable means being distributed with substantial uniformity on both sides of said plane, and brake-applying mechanism operable at will for overcoming the force exerted by said yieldable means to bring the friction members into engagement, the force exerted by said brake-applying mechanism being applied at points substantially to the other side of said plane.

2. A brake of the disk type for a vehicle wheel comprising, in combination, a friction member rotatable with the wheel, a second friction member, a non-rotatable thrust-receiving member adjacent the second friction member, opposed conically sided pits in the adjacent faces of the thrust-receiving member and the second friction member, all located substantially to one side of a plane passing through the axis of rotation, balls in said pits for thrusting the second friction member toward the first friction member upon rotation of the second friction member relative to the thrust-receiving member, yieldable means for normally thrusting the second friction member away from the first friction member, the force exerted by said yieldable means being distributed with substantial uniformity on both sides of said plane, and brake-applying mechanism operable at will for overcoming the force exerted by said yieldable means to bring the friction members into engagement.

3. A brake of the disk type for a vehicle wheel comprising, in combination, a friction member rotatable with the wheel but capable of axial displacement, a fixed central support, a second friction member rotatable upon said support at one side of the first friction member, a third friction member splined to said support at the other side of the first friction member, a locking ring threaded on said support outside the third friction member and having gear teeth by which it may be rotated, means for locating a tool inserted from the outside to rotate said locking ring, a non-rotatable thrust-receiving member adjacent the second friction member, energizing means actuated by rotation of the second friction member relative to the thrust-receiving member for thrusting the second friction member toward the first friction member, yieldable means for normally thrusting the second friction member away from the first friction member, the resultant of the force exerted by said yieldable means being substantially displaced from the resultant of the force exerted by said energizing means, and brake-applying mechanism operable at will for overcoming the force exerted by said yieldable means to bring the friction members into engagement.

4. A brake of the disk type for a vehicle wheel comprising, in combination, a friction member rotatable with the wheel, a second friction member, a non-rotatable thrust-receiving member adjacent the second friction member, opposed inserts in the adjacent faces of the thrust-receiving member and the second friction member, all located substantially to one side of a plane passing through the axis of rotation, conically sided pits in said inserts, balls in said pits for thrusting the second friction member toward the first friction member upon rotation of the second friction member relative to the thrust-receiving member, yieldable means for normally thrusting the second friction member away from the first friction member, the force exerted by said yieldable means being distributed with substantial uniformity on both sides of said plane, and brake-applying mechanism operable at will for overcoming the force exerted by said yieldable means to bring the friction members into engagement.

JAMES HENRY PRATT.
GILBERT EDGAR MANLEY.
ALBERT HENRY GODFREY GIRLING.